United States Patent
Mowatt et al.

(10) Patent No.: US 10,534,599 B2
(45) Date of Patent: Jan. 14, 2020

(54) SOFTWARE UPGRADE ENVISIONING APPLICATION

(71) Applicant: Microsoft Technology Licensing, LLC, Redmond, WA (US)

(72) Inventors: David Mowatt, Dublin (IE); Terry Farrell, Dublin (IE)

(73) Assignee: Microsoft Technology Licensing, LLC, Redmond, WA (US)

(*) Notice: Subject to any disclaimer, the term of this patent is extended or adjusted under 35 U.S.C. 154(b) by 200 days.

(21) Appl. No.: 15/420,491

(22) Filed: Jan. 31, 2017

(65) Prior Publication Data
US 2018/0217829 A1     Aug. 2, 2018

(51) Int. Cl.
| | | |
|---|---|---|
| *G06F 8/65* | (2018.01) | |
| *G06F 3/0484* | (2013.01) | |
| *G06F 8/71* | (2018.01) | |
| *G06F 9/451* | (2018.01) | |

(52) U.S. Cl.
CPC .......... *G06F 8/65* (2013.01); *G06F 3/0484* (2013.01); *G06F 8/71* (2013.01); *G06F 9/451* (2018.02)

(58) Field of Classification Search
CPC ..... G06F 8/61; G06F 8/65; G06F 8/71; G06F 3/0484
See application file for complete search history.

(56) References Cited

U.S. PATENT DOCUMENTS

| | | | | |
|---|---|---|---|---|
| 6,532,023 B1* | 3/2003 | Schumacher | ....... | G06F 11/3414 |
| | | | | 714/E11.193 |
| 7,191,435 B2 | 3/2007 | Lau et al. | | |
| 8,326,794 B1* | 12/2012 | Wood | ........... | G06F 11/3485 |
| | | | | 707/600 |
| 8,434,066 B2 | 4/2013 | Sharma | | |
| 9,076,231 B1 | 7/2015 | Hill et al. | | |
| 9,438,648 B2 | 9/2016 | Asenjo et al. | | |
| 2002/0129352 A1 | 9/2002 | Brodersen et al. | | |
| 2005/0071760 A1* | 3/2005 | Jaeger | ........... | G06F 9/453 |
| | | | | 715/705 |

(Continued)

OTHER PUBLICATIONS

Beatty, et al., "Erp Ii: Best Practices for Successfully Implementing an Erp Upgrade", In Journal of communications of the ACM, vol. 49, No. 3, Mar. 2006, pp. 105-109.

*Primary Examiner* — Amy Ng
*Assistant Examiner* — William Wong
(74) *Attorney, Agent, or Firm* — Michael Best & Friedrich LLP

(57) ABSTRACT

Methods and systems for envisioning benefits of a software upgrade. One system includes at least one electronic processor configured to detect when a user performs actions within a software application, capture data about user actions and application features, and determine through a set of rules if an updated or new feature to perform the user actions exists in an upgraded version of the application software. The electronic processor is also configured to, when a rule triggers, store user and application data and present to the user a visualization of the updated feature available in the upgraded application software. User and application data can be aggregated for a plurality of users, a plurality of application software, or both. Display of new features to a plurality of users can be user controlled or controlled by a super user based on analysis and reporting of user data accumulated over time.

17 Claims, 8 Drawing Sheets

(56) References Cited

U.S. PATENT DOCUMENTS

| | | | |
|---|---|---|---|
| 2005/0086457 A1 | 4/2005 | Hohman | |
| 2008/0027924 A1* | 1/2008 | Hamilton | G06F 17/30867 |
| 2008/0250323 A1* | 10/2008 | Huff | G06F 9/453 |
| | | | 715/733 |
| 2010/0070962 A1* | 3/2010 | Sinn | G06F 8/65 |
| | | | 717/171 |
| 2010/0331064 A1* | 12/2010 | Michelstein | G06Q 10/10 |
| | | | 463/1 |
| 2011/0078120 A1 | 3/2011 | Tyhurst et al. | |
| 2013/0042230 A1* | 2/2013 | Little | G06F 8/65 |
| | | | 717/173 |
| 2014/0032656 A1* | 1/2014 | Hyman | G06Q 30/02 |
| | | | 709/204 |
| 2014/0101647 A1 | 4/2014 | Huang | |
| 2014/0278766 A1* | 9/2014 | Dudkiewicz | H04L 67/34 |
| | | | 705/7.29 |
| 2015/0020061 A1* | 1/2015 | Ravi | G06F 8/65 |
| | | | 717/172 |
| 2015/0112995 A1 | 4/2015 | Elyada et al. | |
| 2015/0186133 A1* | 7/2015 | Yarra | G06F 8/65 |
| | | | 717/121 |
| 2015/0262281 A1 | 9/2015 | Shaphy et al. | |
| 2016/0198536 A1 | 7/2016 | Britt et al. | |
| 2016/0330291 A1 | 11/2016 | Asenjo et al. | |

* cited by examiner

Local Process

SOFTWARE UPGRADE ENVISIONING APPLICATION

FIELD

Embodiments relate to monitoring user actions within a software application to determine when to upgrade the software application to a new version. Embodiments also relate to facilitating organizational decisions related to software upgrades across groups of users.

BACKGROUND OF THE INVENTION

Software applications go through multiple upgrades in functionality throughout their lifespans. Typically, each upgrade changes or extends existing functionality, provides new functionality, and increases usability, among other things. Software vendors encourage users to install upgrades to gain the benefit of new or extended features as well as gather data to analyze user behavior and determine which features to add to application software.

Typically, software vendors rely on marketing to convey the value and advantages of new features within the upgraded software to users and to those who make upgrade decisions across groups of users within an organization. Most times, users and decision makers can only read the marketing materials or review short videos or animations of new features when attempting to evaluate how new features would assist in the day-to-day use of a software applications. Upgrading application software within an organization requires planning that may include training, data conversion, compatibility with other software infrastructure, analysis of the impact on network bandwidth, storage capacity change, and other factors. The benefit of a software upgrade should outweigh the totality of these efforts. In addition, deploying application software and user data to the cloud may be an option for some organizations. Moving to the cloud can be motivated by the time and resources needed to repeatedly upgrade applications, a process that can often be done more efficiently with a cloud instance.

Existing solutions to the problem of gathering user feedback on day-today use of software applications require user data to be communicated from user devices or application servers inside firewalls to servers outside the protection of firewalls. These solutions fail to work if communication cannot be established and in many instances are completed turned off because users or user organizations refuse to send private data outside the organizational firewall. The systems described here operate inside a user or organizational firewall and only permit data sharing outside the firewall upon user command and only then communicate specific, scrubbed data free of private or confidential information.

SUMMARY

Many current techniques of evaluating upgrades often do not support data-driven decisions regarding, for example, how often users would benefit from a new feature and what, specifically, the benefit would provide in terms of frequency of use and improved productivity, accuracy, or correctness over time. Some embodiments monitor user activity within a software application and capture those user activities to identify activities that could be carried out using a feature within an upgraded version of the software application. Used individually, embodiments provide feedback to a software user as to features within an upgraded application that may be useful to the user. The feedback is provided visually and allows a user to assess the value to be gained by upgrading a software application to an upgraded or new version, thus enhancing user productivity and effectiveness in using the application. Used globally, captured user actions and data on when and how an upgraded feature could be used in a new version of a software application helps decision makers determine when to upgrade a software application to make an upgrade effective (for example, in terms of usefulness and cost) for an organization.

Embodiments provide, among other things, systems and methods for capturing data on user actions within a software application, determining if such actions relate to upgraded features of the application, and providing visual and accumulated information for determining if and when a software application should be upgraded to a new version. One embodiment may identify associations between specific user actions, for example, formatting a repeated phrase within a large document or across a set of documents, and features in an updated version of the software application, for example, repeatedly applying the formatting (for example, bolding the text) quickly across the document or documents. The association may be identified by detecting user actions within the software application over time and then using a rules-based or other decision system to associate the user actions with one or more upgraded features within a newer version of the application. Once an association is identified, that association may be stored for one or more users of the software in a repository of detected associations inside a user firewall, organizational firewall, or both, that can provide a user with a more complete, quantitative understanding of the frequency of use and benefit derived from one or more features in a newer version of an application. The association may be used to present the user a visualization as to how an upgraded feature could be used to accomplish a user action. The visualization explains or includes information regarding one or more benefits of using the updated feature when using the upgraded application software. The associations may also be used by a decision maker to assess the cost-benefit of upgrading the software application across a potentially large group of users.

For example, one embodiment provides a system for capturing quantitative data on user actions and features within an upgraded version of the software application. The quantitative data may include application content, previous and subsequent user actions, actual time between user actions, total time across a sequence of user actions, and the like. The system includes at least one electronic processor configured to execute a software application and the envisioning application whereby the actions performed by a user and data generated by user actions are captured through at least one user device. The envisioning application associates user actions and data with new features in an upgraded version of the application. The frequency of the occurrence of user action-feature associations as well as all associations between user actions and multiple features and a plurality of actions are stored for analysis and review to support decisions as to when to upgrade to a new version of application software.

Another embodiment provides an upgrade envisioning system comprising an electronic processor configured to detect and capture user actions within application software. The electronic processor is also configured to access a rules library that associates user actions with features in an upgraded version of the application software; associate user actions to updated features in the upgraded version of the application software using rules in the rules library; upon triggering a rule in the rules library associating a user action with a feature in the rules library, identify a visualization presenting an updated feature in the upgraded version of the application software; store the user action and associated feature in a storage device; and optionally present the visualization to the user via a display.

Yet another embodiment provides a method of providing a visualization of upgraded software, the method includes accessing, via an electronic processor, a rules library that associates user actions with features in an upgraded version of application software. The method also includes detecting and capturing user actions within the application software; associating user actions to updated features in the upgraded version of the application software using rules in the rules library; upon triggering a rule in the rules library associating a user action with a feature in the rules library, identifying a visualization presenting an updated feature in the upgraded version of the application software, storing the user action and associated feature, and presenting, on a display, the visualization to the user.

Other embodiments will become apparent in light of the drawings and description hereof.

BRIEF DESCRIPTION OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention, and explain various principles and advantages of those embodiments.

FIG. 2a illustrates a method of detecting user actions within a software application, associating the actions with features in an upgraded version of the application software, and optionally, presenting a visualization of the updated feature to one or more users using the system of FIG. 1a.

DETAILED DESCRIPTION OF THE INVENTION

Before any embodiments are explained in detail, it is to be understood that the embodiments are not limited in their application to the details of construction and the arrangement of components set forth in the following description or illustrated in the accompanying drawings. Other embodiments and implementations are possible.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items.

As noted above, embodiments provide, among other things, systems and methods for presenting one or more visualizations of updated features available in upgraded versions of software applications to users. Presenting visualizations of updated features of upgraded application software may be based on rules, within a rules library, associating user actions, for example, mouse clicks, menus selections, input data and the like to updated features available in upgraded versions of the software. For example, as described in more detail below, a user may begin to change a particular phrase to bolded capital letters (for example, change "user selection" to "USER SELECTION") by manually retyping all letters in the phrase. The envisioning application may detect the first three manual replacements which trigger a rule based on a new feature in the word processing application that allows automatic search and replacement across the document by simply clicking, for example, an "approve global linguistic replace" button. The "global linguistic replace" in this example does not merely replace keywords but instead understands such words exist in equivalent variations. For example, if the keyword to replace is "provide" the new feature can replace instances of "providing" and "provided" which saves the user from executing find and replace two additional times as well as improves the accuracy of user actions in the likely event the user forgets to replace equivalent words. In some embodiments, one or more rules within a rules library may be triggered by single user actions, a sequence of user actions within a specified time frame, or a set of user actions occurring over any length of time, or the like, coupled with the existence of a new feature in the upgraded version of the application. In a distributed embodiment, a server may store the triggering of rules across multiple users for analysis and review by a user or "super user" (for example, supervisor, system administrator, technology officer, or the like). In some distributed embodiments, users may not see an example use of the new feature until the visualization of that feature has been approved and triggered for presentation on one or more user device by a super user of administrator device 110.

Figure 1A:
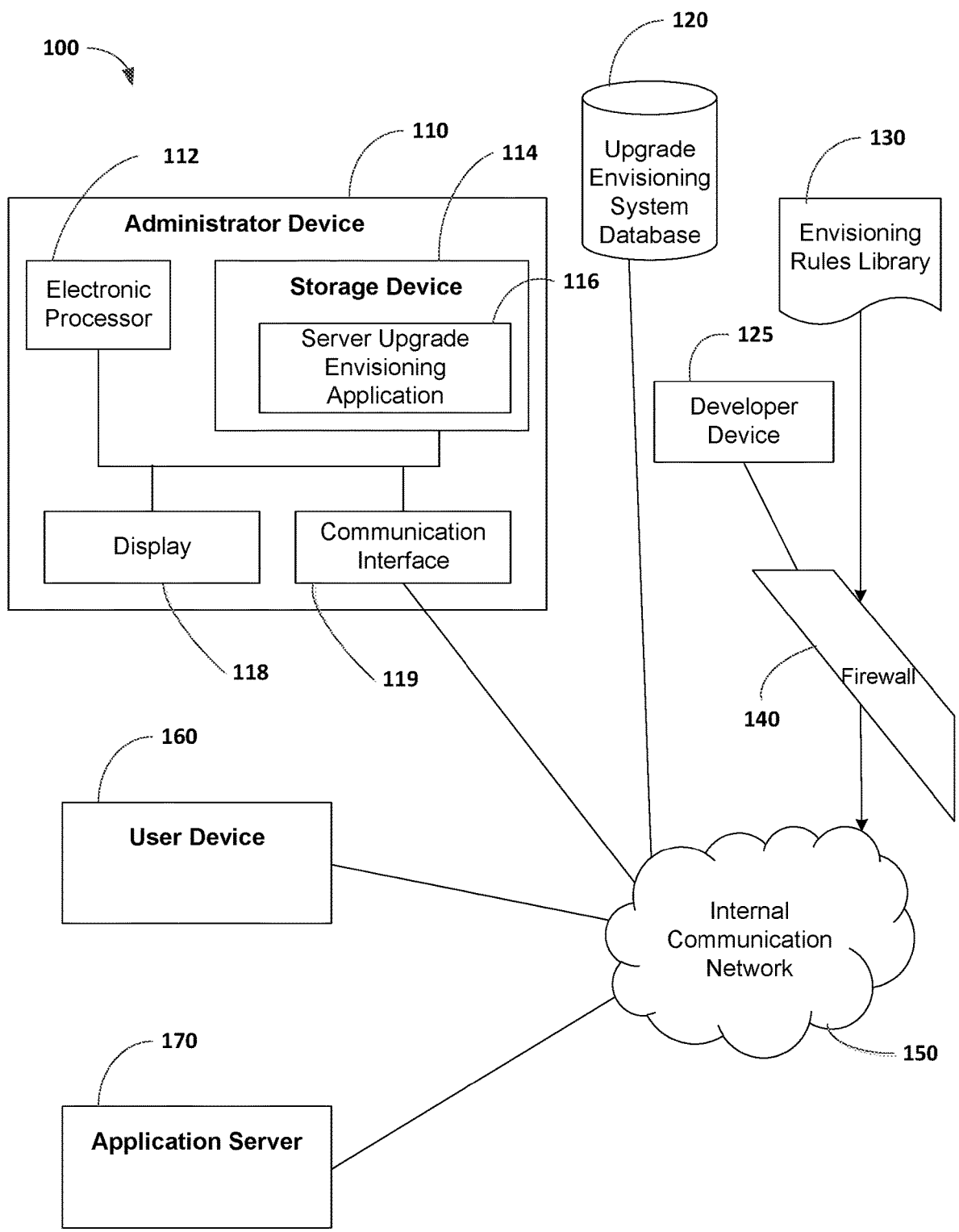
FIG. 1a is a diagram of a system for providing a user with information about an upgraded version of application software based on user actions within an older version of application software.

FIG. 1a is a block diagram of a system 100 for capturing and analyzing user action-feature associations, and optionally enabling presentation of visualizations of updated software functionality to one or more user devices according to one embodiment. In some embodiments, the system 100 may include an administrator device 110, an upgrade envisioning system database 120, a developer device 125, and envisioning rules library 130. Envisioning rules library 130 may be stored remotely and delivered through a firewall 140. The system 100 also includes an internal communication network 150. The internal communication network 150 may be a wired or wireless communication network. Portions of the internal communication network 150 may be implemented using a wide area network, (for example, the Intranet), a local area network (for example, a Bluetooth™ network or Wi-Fi network), and combinations or derivatives thereof.

The administrator device 110 may be a laptop or desktop computer or a server, although other devices, including a tablet computer or other portable computing device could also be utilized. The administrator device 110 includes an electronic processor 112, a memory or similar storage device 114, and a communication interface 119. The electronic processor 112, the storage device 114, and the communication interface 119 communicate over one or more communication lines or buses, wireless connections, or a combination thereof. It should be understood that, in various configurations, the administrator device 110 may include additional or alternative components than those illustrated in FIG. 1*a* and may perform additional functions than the functionality described herein. For example, in some embodiments, the administrator device 110 includes peripherals, for example, one or more output devices, for example, display 118, a speaker (not shown), or the like, and one or more input devices, for example, a keypad, a touchscreen, a microphone, a camera, or the like (not shown).

The electronic processor 112 may include one or more microprocessors, application-specific integrated circuit (ASIC), or other suitable electronic devices. The storage device 114 includes a non-transitory, computer readable medium. As used in the present application, non-transitory computer-readable medium comprises all computer-readable media except for a transitory, propagating signal. Accordingly, the storage device 114 may include, for example, a hard disk, an optical storage device, a magnetic storage device, ROM (read only memory), RAM (random access memory), register memory, a processor cache, or a combination thereof.

The communication interface 119 sends data to external devices or networks, receives data from external devices or networks, or a combination thereof. The communication interface 119 may include a transceiver for wirelessly communicating over internal communication network 150 and, optionally, one or more additional communication networks or connections. Additionally or alternatively, in some embodiments, the communication interface 119 includes a port for receiving a wire or cable, for example, an Ethernet cable or Universal Serial Bus (USB) cable to facilitate a connection to an external device or network.

The system 100 also includes one or more computing devices, for example, a user device 160 which may be a personal computer, tablet computer, smart telephone, or similar device. It should be recognized that the envisioning rules library 130 may be replicated and copies placed on a plurality of user devices 160. In some embodiments, the upgrade envisioning application 165, further described in FIG. 1*b*, executing on user device 160 detects user actions within software applications and communicates user actions and application feature data to server upgrade envisioning application 116, upgrade envisioning system database 120, or both, over the internal communication network 150. In still other embodiments, one or more users may access application software on the user device 160 communicating over a communication network, for example, internal communication network 150. For example, upgrade envisioning application 165 detects user actions and then determines, through triggering of one of more rules within envisioning rules library 130, if one or more updated features in an upgraded version of the software application could perform the user action. If an envisioning rule is triggered, upgrade envisioning application 165 captures user actions and data and communicates data to server upgrade envisioning application 116, upgrade envisioning system database 120, or both. In some embodiments, if a connection to communication network 150 cannot be established, upgrade envisioning application 165 stores user actions and data locally in storage device 114. When stored locally, user actions and data can be stored in the upgrade envisioning system database 120 by, for example, transfer to a portable storage device (for example, a memory stick) which is then connected to communication network 150, administrator device 110, upgrade envisioning system database 120, or another device on communication network 150 for storage in upgrade envisioning system database 120.

In addition to the components already explained, in the example illustrated the system 100 includes an application server 170. The application server 170 may be implemented, for example, using a single server or a plurality of servers forming a cloud instance. It should be recognized that the envisioning rules library 130 may be replicated and copies placed on the application server 170. In some embodiments, the upgrade envisioning application 165, further described in FIG. 1*b*, executes on application server 170, which is accessed by users on user devices 160 through internal communication network 150. In some embodiments, upgrade envisioning application 165 detects user actions within software applications executing on the application server 170 and communicates user actions and application feature data to server upgrade envisioning application 116, upgrade envisioning system database 120, or both, over the internal communication network 150. In still other embodiments, user actions captured by upgrade envisioning application 165 on application server 170 may be stored on application server 170 temporarily or permanently and transferred to upgrade envisioning system database 120 through other means, for example, copying to a portable storage device for transfer, or transferred from another device connected to upgrade envisioning system database 120, or other means.

In some embodiments, administrator device 110 communicates with upgrade envisioning system database 120 over the internal communication network 150 to server upgrade envisioning application 116 to analyze user data captured from one or more users. In some embodiments, server upgrade envisioning application 116 allows users to enable presentation of updated application features to users, and assist in determining if deploying an upgrade to application software is beneficial. User of administrator device 110 can optionally share user data with developers using developer device 125 using communication interface 119, across internal communication network 150, through firewall 140, for example. Users of developer device 125 can view user data to improve feature delivery, identify new features, and improve feature performance, and the like, based on analysis of user data.

FIG. 1*a* illustrates only one example of the system 100. The system 100 may include additional or fewer components in configurations different from the configuration illustrated in FIG. 1*a*. For example, a plurality of user devices 160 may communicate with the upgrade envisioning system database 120 over the internal communication network 150 to the user, on the user device 160, information about an updated feature of one or more software applications. Also, in some embodiments, the functionality described here as being performed by the administrator device 110 may be distributed over multiple servers or other electronic devices.

The electronic processor 112 is electrically connected to and executes instructions stored in the storage device 114. In particular, as illustrated in FIG. 1*a*, the storage device 114 stores a server upgrade envisioning application 116. As described in more detail below, the administrator device 110, through execution of the server upgrade envisioning application 116 by the electronic processor 112, provides analysis and reports of users' actions within applications on one or more user devices 160. For example, when users interact with software applications on user devices 160 data on actions performed by users while the software is running, for example, menu selections, data entry, formatting, and other selections and inputs are detected on the user device 160, communicated using the internal communication network 150 to the upgrade envisioning system database 120. In some embodiments, the data stored from a plurality of users is presented for analysis and reporting by the server upgrade envisioning application 116. For example, the number of users that repeatedly use a keyword replacement feature within a word processing application (FIND: "is thrilled"; REPLACE: "is happy") is recorded and related to an updated feature in an upgraded version of the word processing application. In this example, the updated feature, global linguistic replace, allows more rapid and more accurate replacement of phrases across a document by replacing multiple forms of the phrase "is thrilled" by finding phrases "are thrilled," "were thrilled," and "was thrilled" and replacing each, respectively, with "are happy," "were happy" and "was happy." A super user reviewing the frequency of use and number of users applying a less efficient and less accurate existing feature can analyze a report produced. For example, analysis by the super user through the server upgrade envisioning application 116 may show that 96 different users applied the less efficient KEYWORD FIND-REPLACE feature 486 distinct times over a 14 day period, with an estimated potential savings of two minutes for each use (totaling 972 minutes of saved time). A super user can determine from analysis and reports how beneficial upgrading existing software to a new version will be.

In some embodiments, the server upgrade envisioning application 116 uses data from the upgrade envisioning system database 120 to provide analysis and reports on a plurality of software applications, for example, spreadsheet, graphics, publishing, and the like. It should be understood that administrator device 110 may provide functionality other than the server upgrade envisioning application 116 (for example, accessing the Internet, managing data bases, implementing email systems, or the like) or, alternatively, may be dedicated to providing application upgrade envisioning information.

In some embodiments, one or more user devices 160 (through triggering of one or more rules within envisioning rules library 130, as described in more detail below) communicate user actions within a software application with the administrator device 110 executing the server upgrade envisioning application 116. The server upgrade envisioning application 116 may annotate, for example, by adding time stamps or relationships to previous user actions, or the like, before storing user actions and application data in the upgrade envisioning system database 120.

Figure 1B:
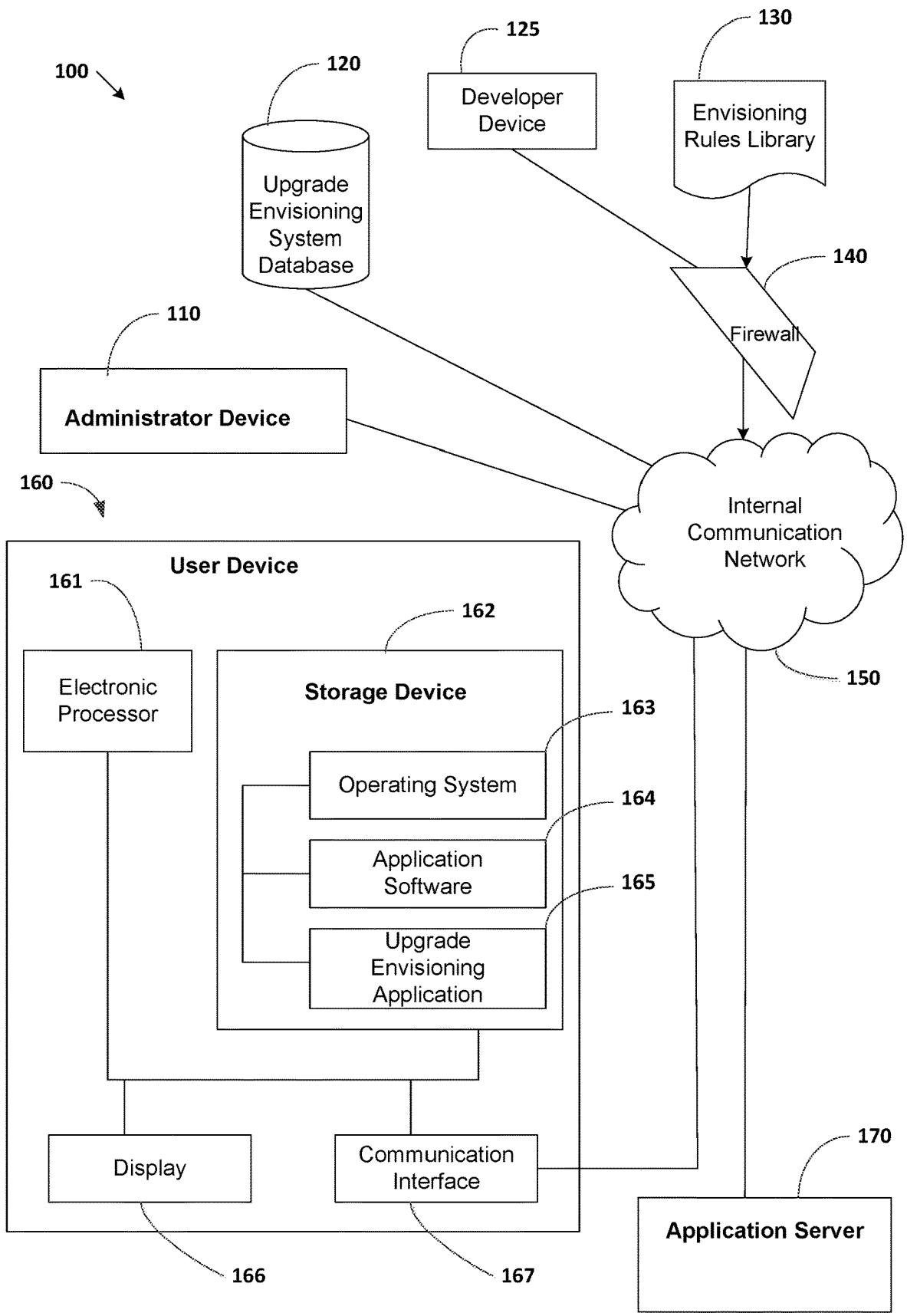
FIG. 1b is a diagram of the system of FIG. 1a illustrating a client upgrade envisioning application on a user device in greater detail.

FIG. 1b illustrates another embodiment of system 100. In the embodiment shown, the system 100 is configured to detect user actions within software applications, capture user and application data about user actions, store user and application data, and present a visualization of updated features available in an upgraded version of software applications. The system may include a user device 160, administrator device 110, upgrade envisioning system database 120, and firewall 140 communicating with an internal communication network 150. In some embodiments, the user device 160, administrator device 110, or both communicate with the upgrade envisioning system database 120. In some embodiments, user device 160 stores a copy of envisioning rules library 130 communicated through firewall 140 and using internal communication network 150.

As illustrated in FIG. 1b, user device 160 includes an electronic processor 161 and a memory or storage device 162. These components are similar to the electronic processor 112 and storage device 114. As a consequence, they are not described in further detail. The storage device 162 stores or contains an operating system 163, application software 164, and upgrade envisioning application 165. A communication interface 167 transfers user actions and data from application software 164 to administrator device 110 and upgrade envisioning system database 120. User device 160 receives envisioning rules library 130 from external devices or networks through firewall 140 over the internal communication network 150.

The electronic processor 161 executes or runs instructions stored in the storage device 162. The electronic processor 161 executes application software 164, which accepts user input and responds to user actions while the application software 164 runs. For example, three user actions for example: enter a string of text into the application software, highlight the text, and select a button to change the text to Bold. Upgrade envisioning application 165, interacting with application software 164 detects and captures user actions, as further described below with respect to FIG. 2b. In some embodiments, upgrade envisioning application 165 detects and captures user actions by interacting with operating system 163, application software 164, or both.

Upgrade envisioning application 165 compares user actions captured within application software 164 to rules within envisioning rules library 130 stored within storage device 162. Such comparison determines which, if any, updated features in an upgraded version of application software 164 can be used to accomplish the detected user actions. Continuing the previous example, the upgrade envisioning application 165 captures the user actions of 1) entering text, 2) selecting the entered text, and 3) clicking a button to bold the text. A rule within envisioning rules library 130 triggers when these three specific user actions occur because such actions relate to an updated feature, namely, for example, a feature that allows a user to bold newly entered text immediately after entry by a single mouse click. The new feature eliminates the need for the user to highlight text before bolding, a time consuming and error prone user action.

An example rule in envisioning rules library 130, in one embodiment, tests the last three user actions using a format modeled after Extensible Markup Language (XML) format. An example of this format is:

```
<Rule ID=1 FriendlyName="Auto Fill and Bold">
   <UpgradeMessage>
      < Message ID=1/>
   </UpgradeMessage>
   <Script>
      // if user actions are: text entry, highlight, select bold formatting
      If (FirstUserAction=TextEntry && SecondUserAction=Highlight && ThirdUserAction=Bold)
         StoreUpdatedFeatureData(FullString, AutoFillBold); // store the association
      If (ShowVisualization = Enabled)
         PresentVisualization (AutoFillBold) //present the association to the user
   </Script>
</Rule>
```

In this example, if the last three user actions are text entry, highlighting, and bold formatting, the association between user actions and the feature "AutoFillBold" has been detected. The association triggers storage of the updated feature data locally, in upgrade envisioning system database 120, or both. The rule triggered, in this example "AutoFill-Bold," identifies a specific visualization through an identifier that retrieves the visualization, such as a database key, hashcode uniquely identifying a graphic, or the like. If the presentation of the visualization is enabled, then upgrade envisioning application 165 presents the identified visualization, as illustrated in FIG. 3b, to the user on display 166. It should be understood the example rule is representative of the logic of a single rule and is not meant to be executable on any particular electronic processor as written here and other specification formats for rules in other embodiments of envisioning rules library 130 are possible.

Figure 1C:
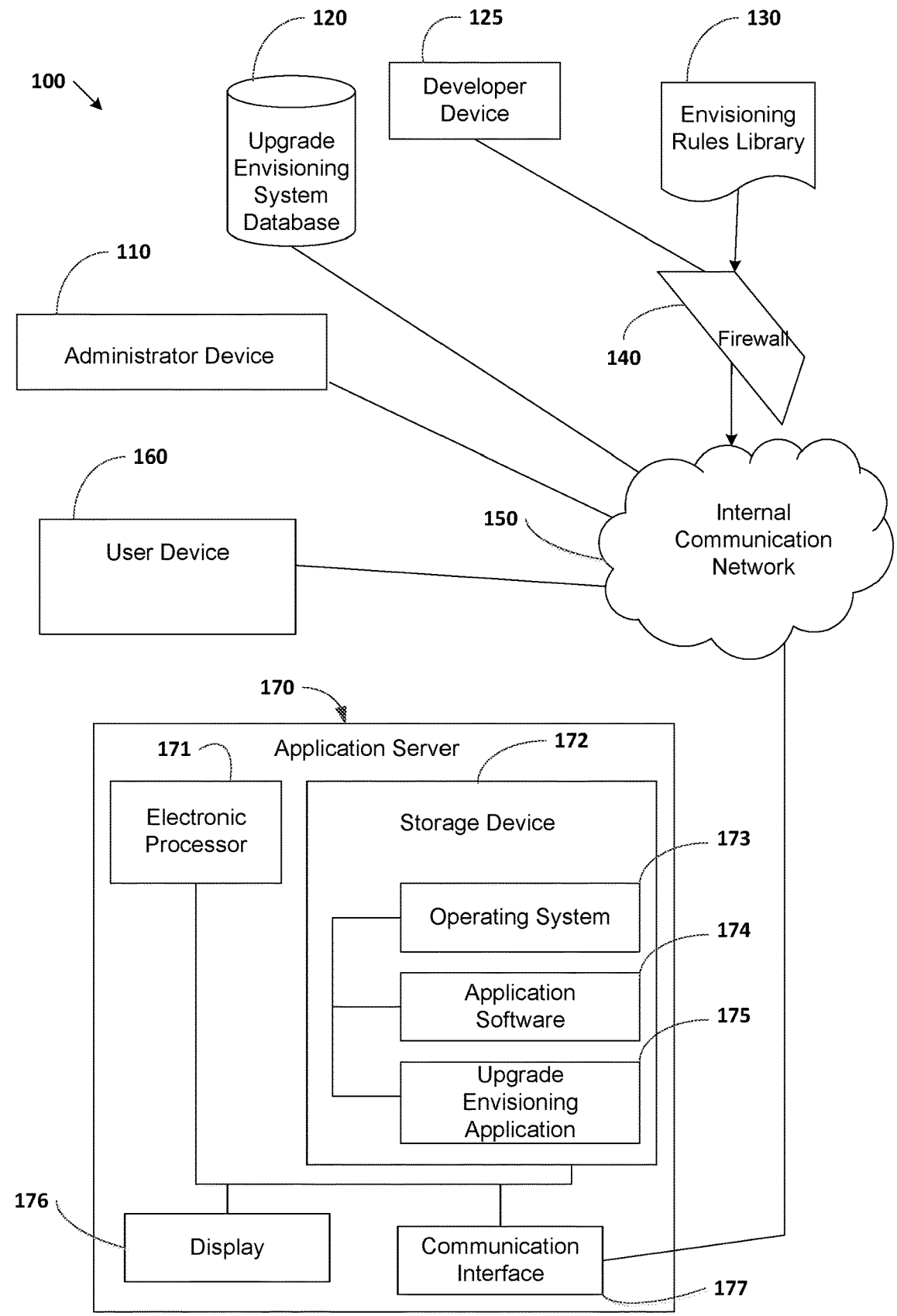
FIG. 1c is a diagram of the system of FIG. 1 illustrating a client device accessing application software and upgrade envisioning application on a server device in greater detail.

FIG. 1c illustrates still another embodiment of system 100. In the example illustrated in FIG. 1c, application server 170 includes an electronic processor 171 and a memory or storage device 172. These components are again similar to the electronic processor 112 and storage device 114. As a consequence, they are not described in further detail. The storage device 172 stores or contains an operating system 173 including network service support functionality that allows users to connect to application server 170 and access application software 174, and upgrade envisioning application 175. A communication interface 177 sends user actions and data from application software 174 to administrator device 110 and upgrade envisioning system database 120. In this embodiment, application server 170 receives envisioning rules library 130 from external devices or networks through firewall 140 over the internal communication network 150.

The electronic processor 171 executes or runs instructions stored in the storage device 172. The electronic processor 171 executes application software 174, which accepts user input from user device 160 through internal communication network 150, user actions detected on application server 170, or both, and responds to user actions while application software 174 runs. In this embodiment, continuing the previous example, three user actions occur: enter a string of text into the application software, highlight the text, and select a button to change the text to bold. Upgrade envisioning application 175, interacting with application software 164 detects and captures text input user action on the client device, and the text highlighting and button selection on application server 170. In some embodiments, upgrade envisioning application 175 detects and captures user actions by interacting with operating system 163, application software 164, user device 160, or a combination of one or more of these.

Upgrade envisioning application 175 compares user actions captured from user activities within application software 174 to rules within envisioning rules library 130 stored within storage device 172. Such comparison determines which, if any, updated features in an upgraded version of application software 174 can be used to accomplish the detected user actions. Continuing the previous example, the upgrade envisioning application 175 captures the user actions of 1) entering text, 2) selecting the entered text, and 3) clicking a button to bold the text. A rule within envisioning rules library 130 on application server 170 triggers when these three specific user actions occur because such actions relate to an updated feature, namely, for example, a feature that allows a user to bold newly entered text immediately after entry by a single mouse click. The new feature eliminates the need for the user to highlight text before bolding, a time consuming and error prone user action.

In the example embodiment shown in FIG. 1c, users of user device 160 access application software 174 through internal communication network 150 through a web browser, remote desktop connection, virtual machine, or the like. Application software 174 and upgrade envisioning application 175 execute on electronic processor 171 on application server 170. It should be understood that application software may be a software application such as word processing or spreadsheet applications, or a web-based application including, for example, a web interface, database, and web services to perform user functions, or another configuration of application and web-based software that provides application software functionality to users.

Figure 2A:
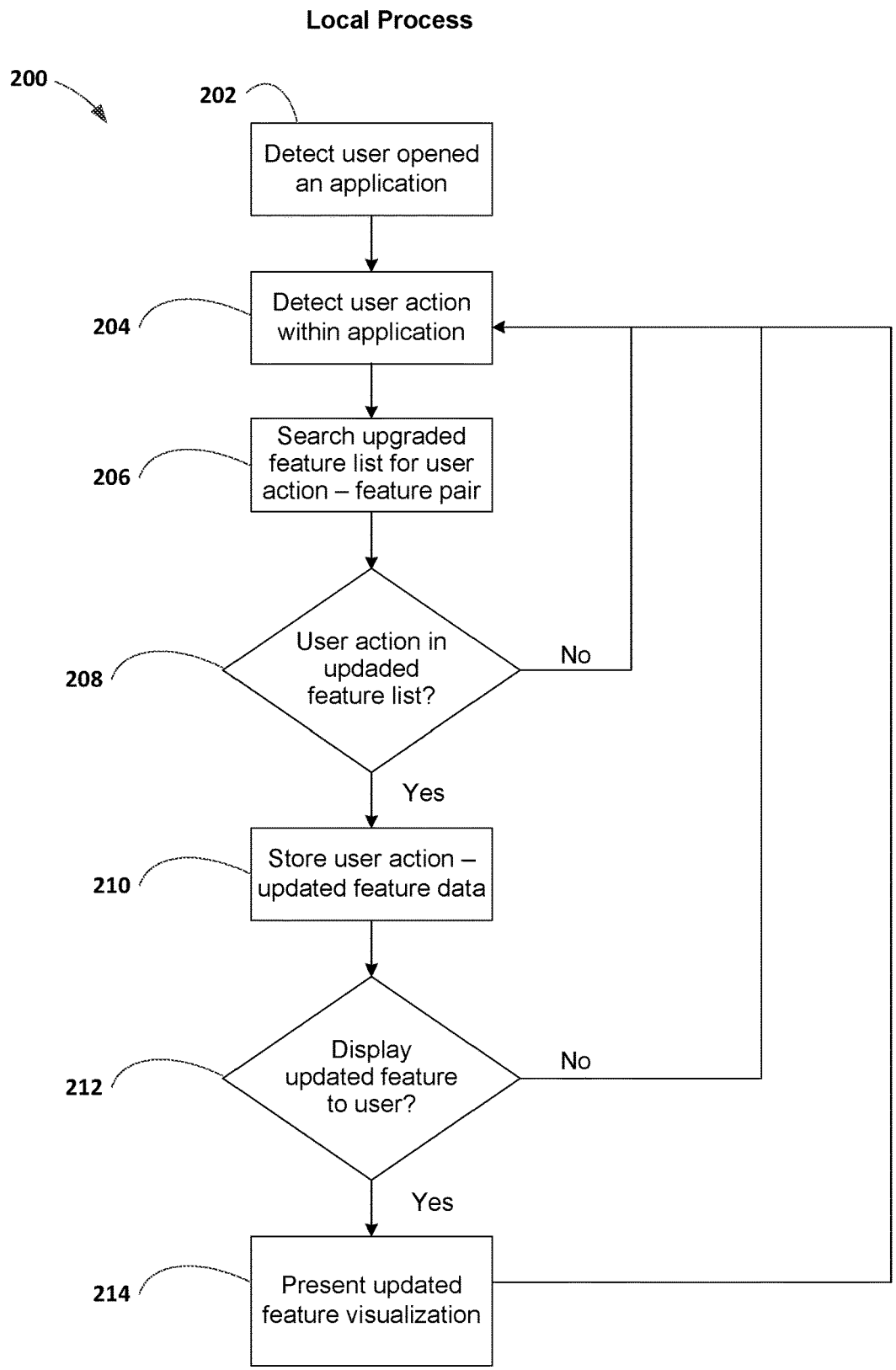

In one embodiment, as described in more detail in FIG. 2a, information as to the updated feature may, optionally, be presented to the user. The presentation may, for example, be a visualization presented on display 166 consisting of a graphic representation of the updated feature and description of how the updated feature is used within an upgraded version of application software 164. Continuing text bolding example, and further illustrated in FIG. 3b, the visualization presents a graphic of a document, containing text entered and the button or input mechanism needed to automatically complete the phrase and convert all the text to bold. In one embodiment, the user may choose to enable when visualizations of updated features are presented so as not to continually interrupt the user's workflow within application software. In yet another embodiment, the timing as to when to present visualization of updated features on display 166 is set by a user from the administrator device 110 executing the server upgrade envisioning application 116. Presentation of visualizations may be enabled periodically, for example only after accumulating data over a day or a week, or only after one or more rules triggers a specific number of times thus allowing a move powerful illustration of the benefit of upgrading to a new version of application software 164.

According to one embodiment, and as also described in more detail below with respect to FIG. 2b, when a rule triggers within the upgrade envisioning application 165 data, for example, user actions, user input data, application software data, time data, rule data, and the like, are communicated to the administrator device 110, upgrade envisioning system database 120, or both, for storage in the upgrade envisioning system database 120. In one embodiment, the upgrade envisioning system database 120 stores data from a plurality of users for one or more instances of the application software 164. For example, over a period of time (for example, a month), several hundred users generate data by performing the three actions previously described (enter text, highlight the text, choose Bold formatting) which triggers the envisioning rule for bolding text. A user of the administrator device 110 analyzes user action, feature, application software, and other data using server upgrade envisioning application 116 and display 118. A user can analyze the likely use of a set of updated features and determine the benefit of upgrading to a new version of application software 164.

According to one embodiment, the upgrade envisioning application 165 stores at least one envisioning rules library 130 for at least one application software 164 for a plurality of users. Using the server upgrade envisioning application 116, a user can analyze and report user actions across all application software 164. The user of this embodiment may choose to upgrade multiple types of application software 164 simultaneously when sufficient benefit, appropriate timing, or another factor makes such a choice desirable.

FIG. 2a illustrates a method 200 of providing software application upgrade envisioning on user device 160 according to one embodiment. As illustrated in FIG. 2a, as part of the method 200, the upgrade envisioning application 165, communicating with application software 164, operating system 163, or both, detects the user has started application software 164 (at block 202). Upgrade envisioning application 165 detects user actions within application software 164 and captures user mouse clicks, keystrokes, mouse movements, touchscreen interactions, and the like through communication with application software 164 or operating system 163, or both (at block 204).

In some embodiments, captured user data, including mouse clicks, data entered, and the like, associated with a feature of within the application software 164 are compared to user action-feature pairs within a copy of envisioning rules library 130. For example, a user may enter text, highlight the text, and then select a "Bold" button. If the user begins to enter the same text again, the user action of entering this text paired with the "Bold" feature is a user action-feature data that can be used to trigger rules within the envisioning rules library 130. If the user action—feature data triggers a rule that identifies an updated function an upgraded version of application software 164 (at decision block 208) then upgrade envisioning application 165 stores user actions-updated feature data locally in storage device 162, upgrade envisioning system database 120, or both (at block 210). Continuing the previous example, the user action of repeatedly entering text, highlighting, and selecting "Bold" can be paired with an updated feature that, upon detecting the user actions, converts the previously and newly entered text to "Bold" without the need for highlighting and selecting "Bold."

In some embodiments (illustrated for example in FIG. 3*b*), the user-action-updated feature pair is associated with a visualization of an updated feature function and, optionally, presented to the user. As shown in FIG. 2, if presentation of the visualization of an updated feature function has been enabled (tested at block 212), the visualization is displayed on display 166 of the user device 160 (at block 214). The visualization of the updated feature explains how the updated feature would accomplish the user action and, in some embodiments, suggests or specifies how the new feature improves productivity. In the example of "Bold" text, the visualization explains how the text becomes "Bold" without the need for highlighting text and selecting an upgrade button through a mouse click.

As shown in FIG. 2*a*, in some embodiments, if the user action does not associate with an updated feature list (at decision block 208) or the presentation of an updated feature visualization option is disabled (at block 212), the upgrade envisioning application 165 returns to monitoring user action within application software (at block 204). It should be understood that, in some embodiments, the upgrade envisioning application 165 can be started and monitors the user device 160 for the opening, or starting, of multiple types of application software over days, weeks, or even continuously (for example, always running in a background) while in other embodiments the user must start the upgrade envisioning application 165 each time the user chooses to run application software, for example, the application software 164. In still other embodiments, the upgrade envisioning application 165 is associated with specific application software and starts each time the application software is opened.

Figure 2B:
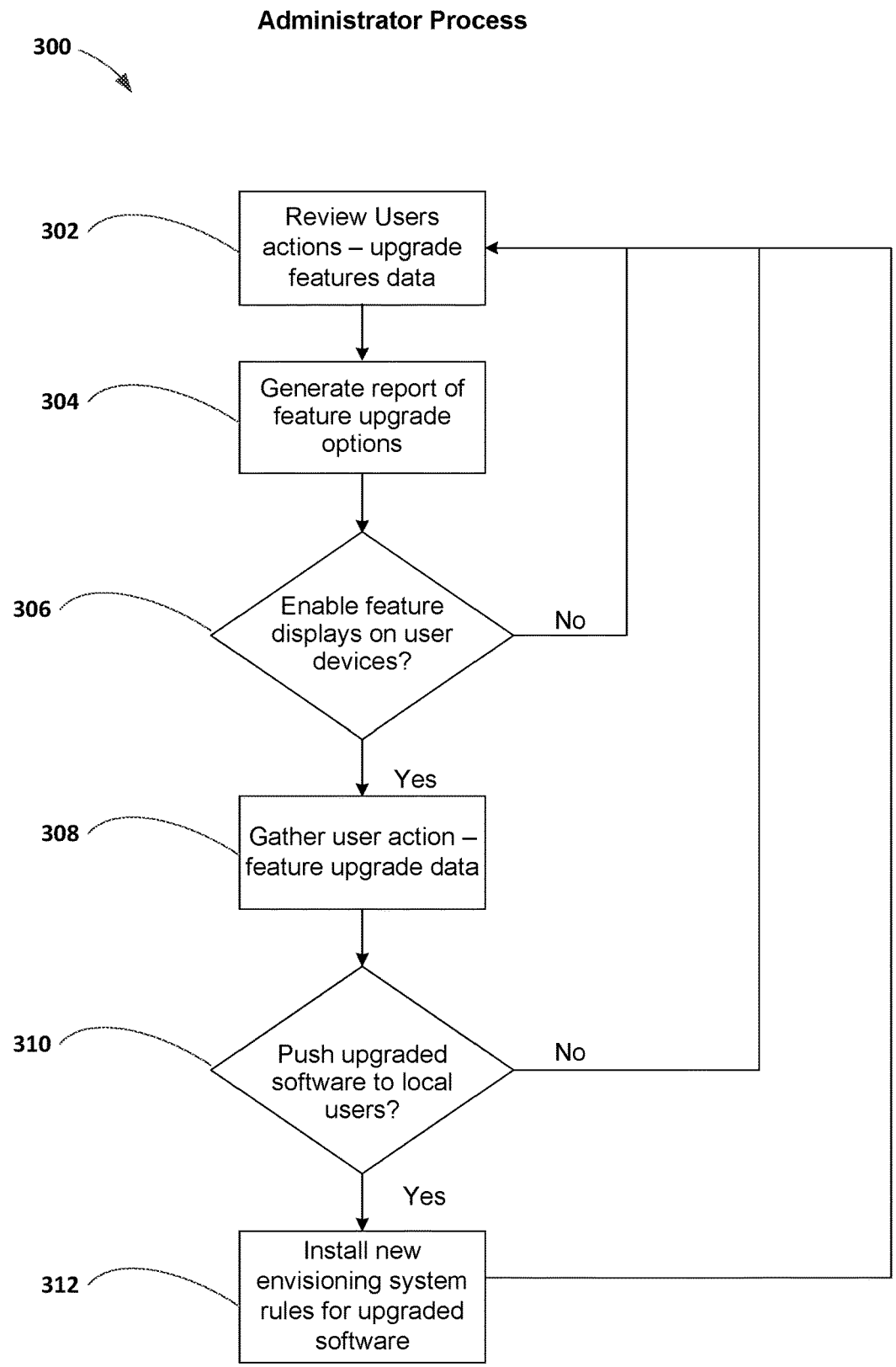
FIG. 2b illustrates a method of storing, analyzing, and providing information to users about features within an upgraded version of a software application using the system of FIG. 1b.

FIG. 2*b* illustrates a method 300 of providing software application upgrade envisioning using the system 100 according to another embodiment. As previously described, as users perform actions within application software 164 on user device 160, upgrade envisioning application 165 captures data on user actions and features and communicates the data to server upgrade envisioning application 116, upgrade envisioning system database 120, or both. A user reviews and analyzes user action and feature data stored in the upgrade envisioning system database 120 using the server upgrade envisioning application 116 (at block 302). For example, a user of the server upgrade envisioning application 116 can review all user actions within a specific software application, only a specific type of user actions within a software application, or a totality of user actions across a plurality of software applications. For example, a user can review the frequency of the text bolding user action for a word processing software application to determine the benefit of upgrading to a new version.

In some embodiments, a user causes an electronic processor to generate a report on user actions, application software features, or both using server upgrade envisioning application 116 (at block 304). For example, a user chooses to generate a report on the frequency of all user actions associated with a word processing application for review and analysis. In some embodiments, the report allows cost-benefit analysis of upgrading to a new version of the software based on how great the totality the frequency of productivity increases exceeds the cost of upgrading application software 164 on all user devices 160.

In some embodiments, a user can choose to enable presentation of updated features visualization on user devices 160 using the server upgrade envisioning application 116 (at block 306). If presentation is enabled, upgrade envisioning application 165 presents a feature visualization (FIG. 2*a* at block 214). In still other embodiments, the user of the server upgrade envisioning application 116 can enable presentation of specific updated feature visualizations rather than all visualizations. For example, enabling only text bolding features rather than all updated features can be done by a user toggling this specific feature visualization on the server upgrade envisioning application 116. An advantage of toggling visualization of specific features is reducing annoyance to users with multiple, repeated presentation of updated feature visualizations not under review. Yet another advantage of enabling presentation of specific update feature visualizations is to gather data from users working on user devices 160 as to the utility of the upgrade feature (at block 308). When presented with a visualization, the user can interact with the visualization, as further described in the example embodiment illustrated in FIG. 3*b*. User interaction with the visualization, the application software after the visualization, or both, provide data that can be stored by upgrade envisioning application 165 on storage device 162 located on user device 160, or stored by upgrade envisioning application 175 on storage device 172 located on application server 170, or in upgrade envisioning system database 120, or a combination of one or more of these storage repositories. In some embodiments, user data captured from interaction with visualizations may include, for example, the presentation frequency of feature visualization, length of time the user views the feature visualization, change in user actions after seeing the visualization, and the like. For example, if users see the feature visualization and continue to perform the same user actions, then upgrade to a new version of the software will likely have a beneficial result. However, a software upgrade may not be warranted if users view the feature visualization and then change their behavior to significantly reduce an inefficient process making a software upgrade less beneficial.

In some embodiments, the user of the administrator device 110 reviews data in upgrade envisioning system database 120 using server upgrade envisioning application 116, which stores user action-feature data from user devices 160. The data may include user action-feature data captured before enabling presentation of updated feature visualizations, user data after presentation of updated feature visualizations, or both. For example, the data may show that for 100 users of application software 164 on user devices 160, 78 users generated an average of 12 user action-feature associations per day before updated feature visualization was enabled and that 75 users continued to generate 12 user action-feature activities after presenting the visualization. In this example, a user of the server upgrade envisioning application 116 can take action to upgrade application software 164 to a new version on user devices 160.

It should be understood that upgrade decisions may involve reviewing a plurality of user action-feature data, across a plurality of users, over a time period. In some embodiments, the upgrade envisioning system, including the administrator device 110, upgrade envisioning system database 120, and user devices 160, monitors multiple types and instances of application software 164 across a plurality of user devices 160. Decisions to upgrade may involve multiple, dependent software applications. For example, upgrading one type of installed application software, for example, a word processing application, bundled with other application software, for example, spreadsheet and image editing application software, may require upgrading all three types of application software. According to some embodiments, system 100 captures user action data on user devices 160 to support upgrade decisions for multiple types of application software 164.

In still other embodiments, user action data may include the user's department, location, job type, or the like within an organization allowing a user of administrator device 110 to analyze and review upgrading based on user types. For example, a set of updated features that aid in adding references to a document (footnotes, endnotes, bibliography) may be heavily used in the research department of an organization but never used by marketing. The benefits of upgrading the research department would be much larger and thus motivate upgrading for that department before upgrading the marketing department.

It should also be understood that in some embodiments, the upgrade envisioning application 165 executing on user device 160 works autonomously from administrator device 110 and upgrade envisioning system database 120. For example, a single user working at home or in an office can use the upgrade envisioning application 165, capturing user action-feature data and storing this data locally. A single user can enable presentation of updated feature visualizations (FIG. 2a at block 212). In this embodiment the history of user action-feature events may be lost or retained for a shorter period of time (for example, a week or until the user action-feature data reaches a specific volume of data). The benefits to a single user of the upgrade envisioning application 165 in this embodiment remain the same, namely, providing data and presenting updated feature visualizations supporting the decision as to if and when to upgrade to a new version of application software 164.

Figure 3A:
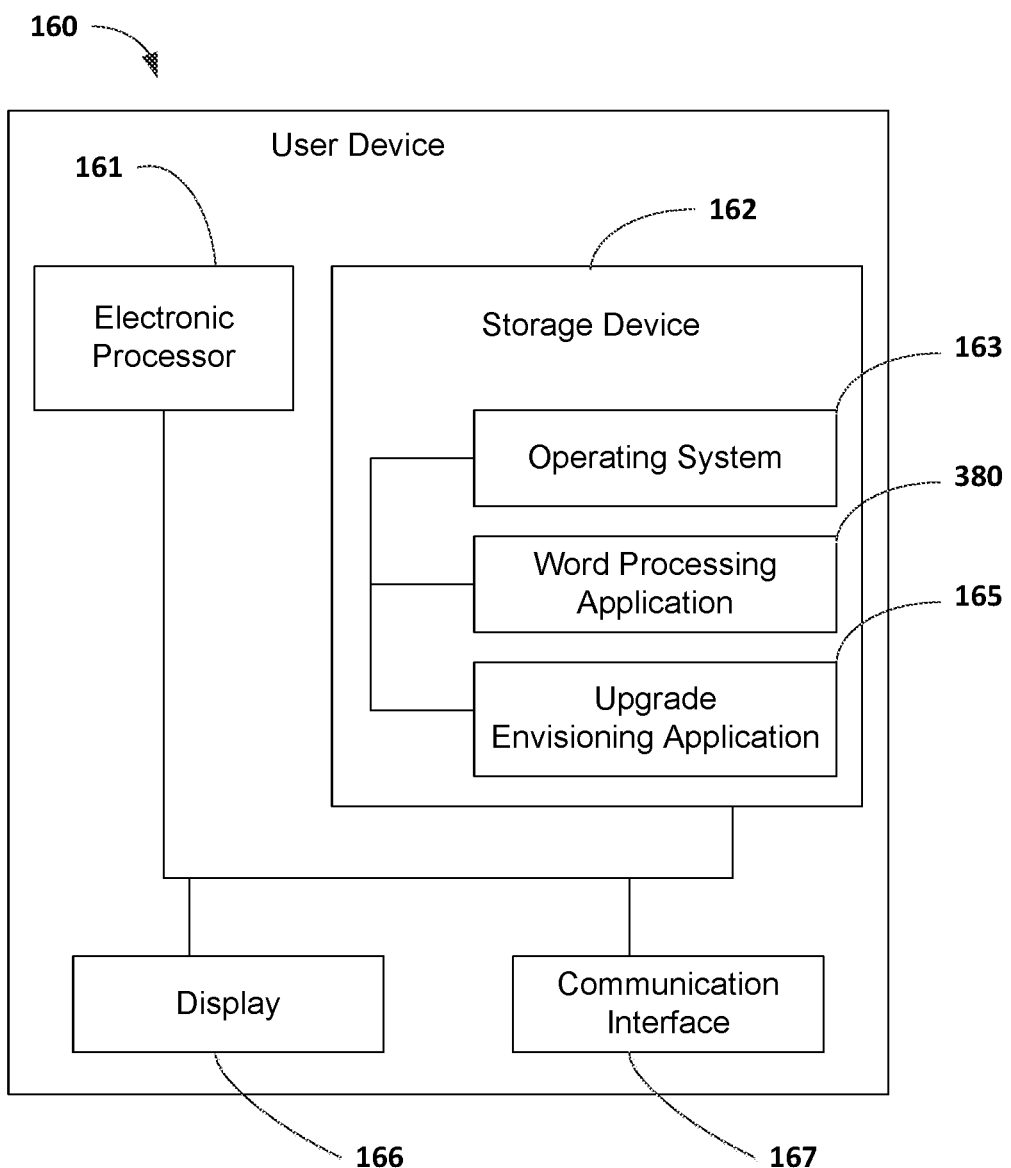
FIG. 3a illustrates the user device of FIG. 1b on which a word processing application has been installed.
Figure 3B:
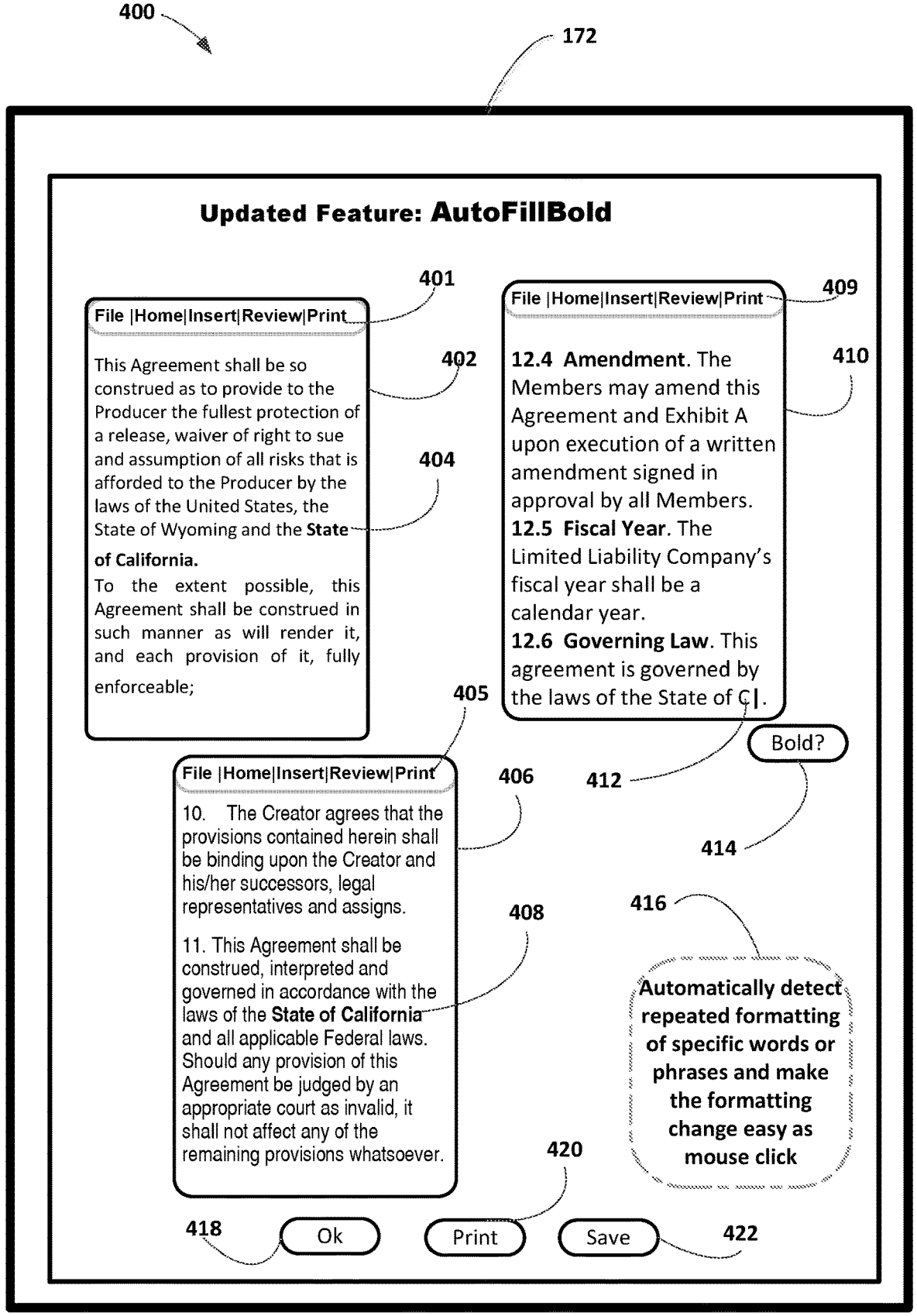
FIG. 3b illustrates an example of a visualization.

An example of application software 164, as illustrated in FIG. 3a, is word processing application 380. As a user performs user actions within word processing application 380, upgrade envisioning application 165 detects and captures user actions and then attempts to associate user action to updated features using rules in envisioning rules library 130. If a rule in envisioning rules library 130 triggers and presentation of visualizations is enabled, the updated feature visualization associated with user actions is presented to the user on display 166 of user device 160.

FIG. 3b illustrates an example updated feature visualization 400 presented on display 166, where application software 164 takes the form of a word processing application 380 (FIG. 3a), executing on electronic processor 161. The visualization includes graphics of the word processing application and three windows, one each for document 402, document 406, and document 410. Each window includes a graphic of a menu bar 401, 405, and 409 respectively. The visualization presents the word processing software in a state where a user has entered and bolded the same text, namely text 404 and 408 ("State of California"), in two different documents, document 402 and document 406. The visualization shows the point in time where the user has entered a portion of the phrase 412 ("State of C"). The updated feature visualization 400 illustrated in FIG. 3b depicts a user entering text into document 410, specifically just the text of phrase 412 "State of C". The updated feature presented in the visualization includes a graphic of button 414 (not a functioning button), which, if selected by the user in the upgraded version of the word processing app using, for example, a mouse click, completes phrase 412 "State of C" to "State of California" and applies bold formatting to the entire phrase. The visualization includes text box 416 explaining the behavior of the new feature to the user. The visualization includes three working buttons. Ok button 418 closes the visualization. Print button 420 allows printing of the visualization through a standard print dialog box. Save button 422 stores the visualization to storage device 162, or other storage device such as an external storage device, network storage device, or the like. FIG. 3b illustrates one embodiment for an updated feature within an example of an upgraded application, namely the word processing application. It should also be understood a visualization may be an animation of the feature with audio explanation, or a sequence of visualizations that together present and explain the new feature, or be presented to the user through a link to a website with such visualizations, animations, audio, video, or the like.

Figure 4:
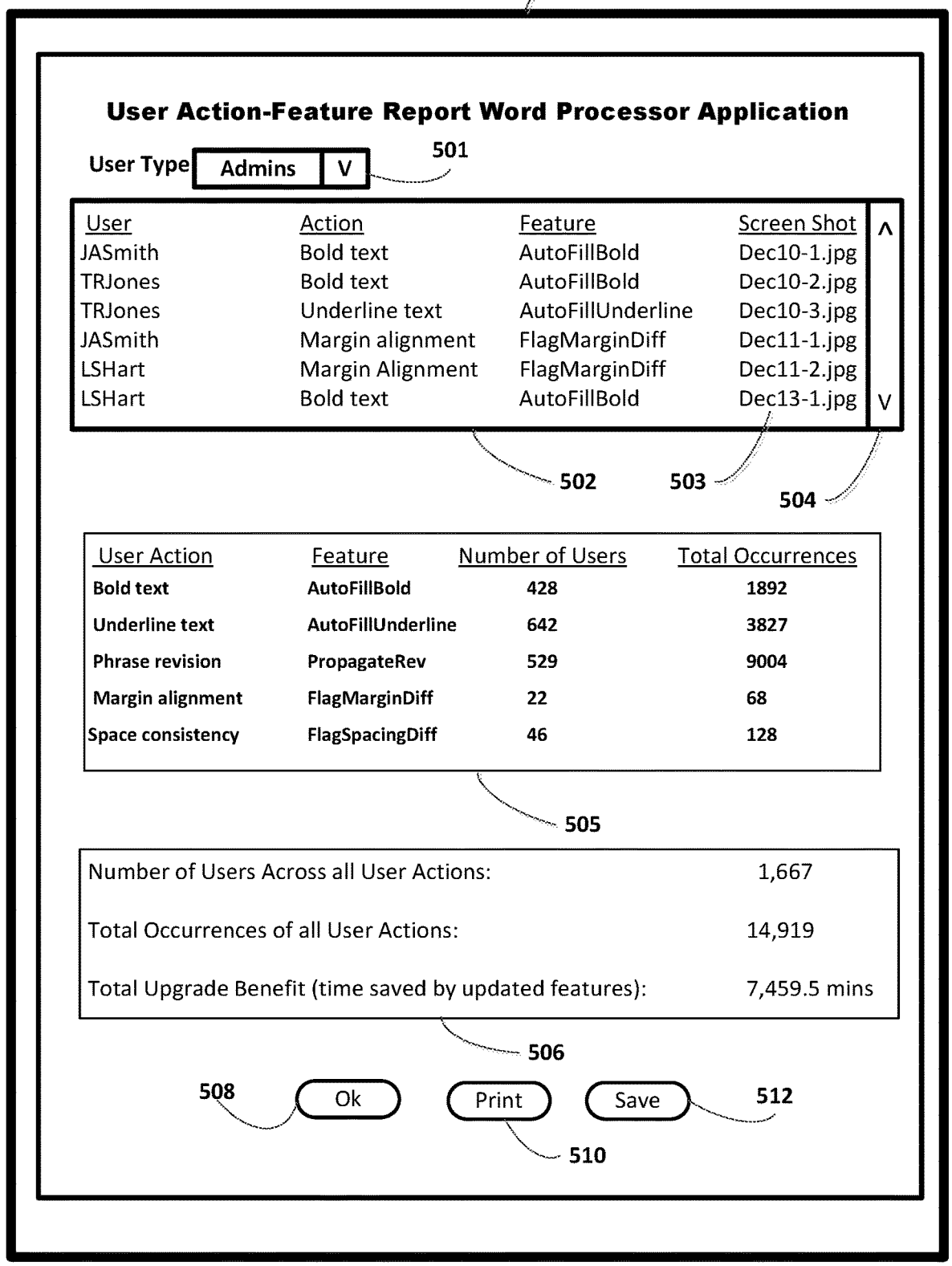
FIG. 4 illustrates an example user action-feature report.

FIG. 4 illustrates an example user action-feature report 500 presented to the user by server upgrade envisioning application 116 on display 118. In this example embodiment user action-feature data for individual users of application software 164, application software 174, or both, is presented in list box 502. User type selection box 501 allows the user to select all users or specific user types. For example, as illustrated in FIG. 4, the user may select Admins to view only users identified as type administrator within the organization. In this example embodiment, the user selected Admin as the user type which then populates List box 502 with user action-feature data stored for administrators. List box 502 may contain image links 503 to screen shots of display 166 when the user of user device 160 performed user actions detected by upgrade envisioning application 165, upgrade envisioning application 175, or both. Scroll bar 504 allows a user of server upgrade envisioning application 116 to scroll through individual user action-feature data for the user type selected in user type selection box 501 using scroll bar 504, in this example embodiment. It should be understood that individual user data stored in upgrade envisioning system database 120 can be displayed to a user of administrator device 110 in many different configurations and that user action-feature report 500 illustrates one example embodiment.

In some embodiments the user of server upgrade envisioning application 116 is presented tabulated, combined, or integrated user action-feature data for review and analysis, as illustrated by user-action table 505 and summation table 506. In example embodiment 500, a summation of user action-feature data stored in upgrade envisioning system database 120 for the user type selected by user type selection box 501 is presented in user-action table 505, showing, for example, the number of users who have performed each user action associated with a feature and the total occurrences of each user action for each feature across all users. Summation table 506, as an example embodiment, presents the user with the total number of users performing user actions associated with a feature at least once, the total occurrences of all user actions associated with a feature, and the total upgrade benefit in terms of minutes saved if the upgraded software was installed and all users performing user actions associated with features took advantage of the updated feature for the user type selected by user type selection box 501. User action-feature report 500 includes three active buttons. Ok button 508 closes the user-action-feature report 500. Print button 510 allows printing of the user-action-feature report 500 through a print dialog box. Save button 512 stores the user-action-feature report 500 to storage device 162, or other storage device such as an external storage device, network storage device, or the like. User action-feature report 500 represents one example of accumulating and combining user action-feature data to support decisions as to if and when to install an upgraded version of application software 164 on user devices 160 or application software 174 on application server 170, or both.

In some embodiments, data shown in FIG. 4 can be shared with software vendor personnel, for example software developers via a developer device 125 connected, for example, through firewall 140 to network 150, user interface specialists, product managers, and the like. In this example, data shared may be anonymized, blocked, removed, redacted, or otherwise hidden from viewers of user action-feature data to protect sensitive or private data. In this embodiment, a software vendor may, for example, use such data to revise current features or develop new features that better meet user needs and further improve software performance, usability, or accuracy.

What is claimed is:

1. An upgrade envisioning system comprising:
an electronic processor configured to:
detect and capture user actions within application software;
access a rules library that associates user actions with features in an upgraded version of the application software;
associate the user actions within the application software to updated features in the upgraded version of the application software using rules in the rules library;
upon triggering a rule in the rules library associating a user action with a feature in the rules library, identify a visualization presenting an updated feature in the upgraded version of the application software, the visualization including a graphical representation of the user actions within the application software and a text box explaining a behavior of the updated feature;
store the user action and the associated feature in a storage device;
present the visualization to the user via a display; and
in response to presenting of the visualization in a display, store user data captured from interaction with the visualization in an upgrade envisioning system database.

2. The system of claim 1, wherein the electronic processor is configured to run the application software.

3. The system of claim 1, further comprising a storage device and a display, wherein the electronic processor is electrically connected to the storage device and the display and wherein the electronic processor, storage device, and display are included in a user device.

4. The system of claim 1, further comprising a storage device and a display, wherein the electronic processor is electrically connected to the storage device and the display, wherein the electronic processor is located on an application server, and the storage device and the display are included in a user device.

5. The system of claim 3, wherein the electronic processor is further configured to:
present to a user a plurality of user actions stored within the storage device,
provide data analysis functions to a user reviewing user actions stored within the storage device,
generate a report from user actions, and
optionally provide data analysis functions to users via access over a network.

6. The system of claim 1, wherein the electronic processor is further configured to store user actions in a database via a transfer of data over a network.

7. The system of claim 1, wherein the electronic processor is further configured to:
present, to a user, a plurality of user actions from a plurality of users stored within the database,
provide data analysis functions to a user reviewing user actions stored within the database,
generate a report from user actions stored within the database, and
provide data analysis functions to users via access over a network.

8. The system of claim 1, further comprising a developer device connected to the electronic processor.

9. A method of providing a visualization of upgraded software, the method comprising:
accessing, via an electronic processor, a rules library that associates user actions with features in an upgraded version of application software;
detecting and capturing user actions within the application software;
associating the user actions within the application software to updated features in the upgraded version of the application software using rules in the rules library;
upon triggering a rule in the rules library associating a user action with a feature in the rules library, identifying a visualization presenting an updated feature in the upgraded version of the application software, the visualization including a graphical representation of the user actions within the application software and a text box explaining a behavior of the updated feature;
storing the user action and the associated feature;
presenting, on a display, the visualization to the user; and
in response to presenting of the visualization in a display, storing user data captured from interaction with the visualization in an upgrade envisioning system database.

10. The method of claim 9, further comprising running, on the electronic processor, the application software.

11. The method of claim 9, wherein storing the user action and associated feature includes storing the user action and associated feature in a storage device included within a user device.

12. The method of claim 11, wherein presenting, on a display, the visualization to the user includes presenting the visualization on a display of the user device.

13. The method of claim 11, further comprising
presenting, via a display, a plurality of user actions stored within the storage device,
providing data analysis functions to a user reviewing user actions stored within the storage device, and
generating a report from user actions.

14. The method of claim 9, further comprising storing user actions in a database by transferring data over a network.

15. The method of claim 14, further comprising:
presenting a plurality of user actions from a plurality of users stored within the database,
providing data analysis functions for reviewing user actions stored within the database,
generating a report from user actions stored within the database.

16. The method of claim 14, wherein generating a report includes generating a report including one or more user types.

17. The method for claim 9, further comprising providing data mapping user actions to features to a developer device.

* * * * *